United States Patent [19]
Hoag

[11] 3,768,657
[45] Oct. 30, 1973

[54] SLUDGE TANK WITH SELF-CLEANING SCREEN AND SCREEN FOR USE THEREIN

[75] Inventor: Don H. Hoag, Erieville, N.Y.

[73] Assignee: Clarkson Industries, Inc., New York, N.Y.

[22] Filed: Oct. 15, 1971

[21] Appl. No.: 189,769

Related U.S. Application Data
[62] Division of Ser. No. 72,746, Sept. 16, 1970, Pat. No. 3,675,778.

[52] U.S. Cl. .............................. 210/298, 210/526
[51] Int. Cl. ............................................ B01d 29/38
[58] Field of Search ............... 210/155, 162, 298, 210/320, 526, 237, 252

[56] References Cited
UNITED STATES PATENTS

| | | | |
|---|---|---|---|
| 2,102,570 | 12/1937 | Lind | 210/298 |
| 2,861,688 | 11/1958 | Harris | 210/298 X |
| 1,180,798 | 4/1916 | Spoor | 210/162 |
| 2,996,189 | 8/1961 | Salterbach | 210/155 |

Primary Examiner—John Adee
Attorney—Curtis, Morris & Safford

[57] ABSTRACT

A conveyorized sludge tank is provided with a screen mounted at the bottom of the tank for swinging motion toward and away from the flights of the conveyor and adapted to lean against a course of the conveyor to cause the conveyor flights to continuously wipe the filtering surface of the screen. The screen is preferably formed in sections, each of which has spaced filtering strips and the filtering strips of adjacent sections diverge to form a herringbone pattern that minimizes and equalizes wear on the conveyor flights.

8 Claims, 5 Drawing Figures

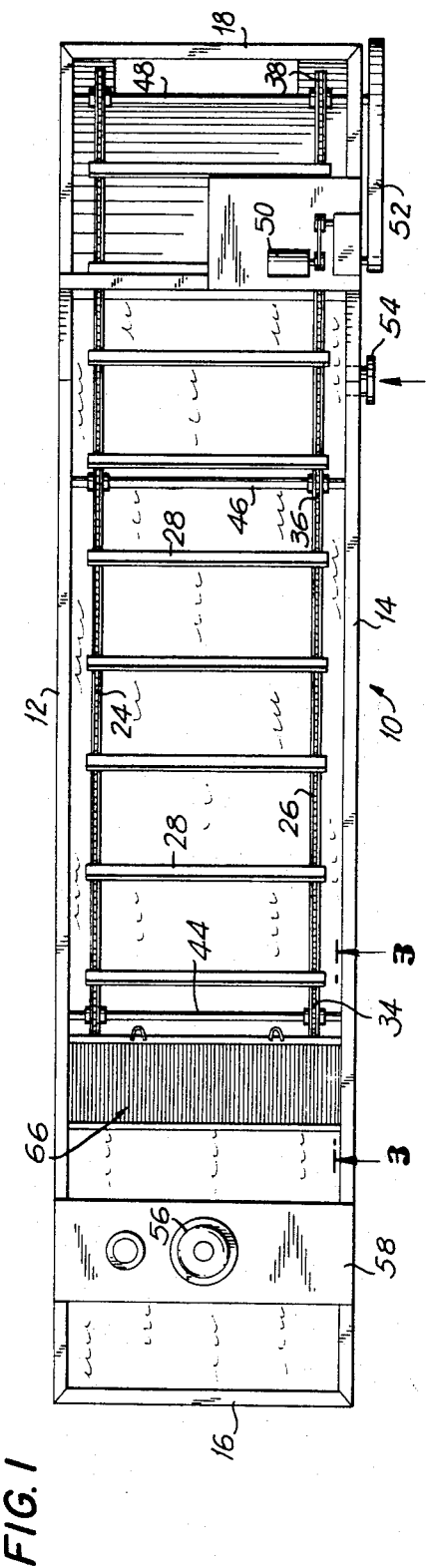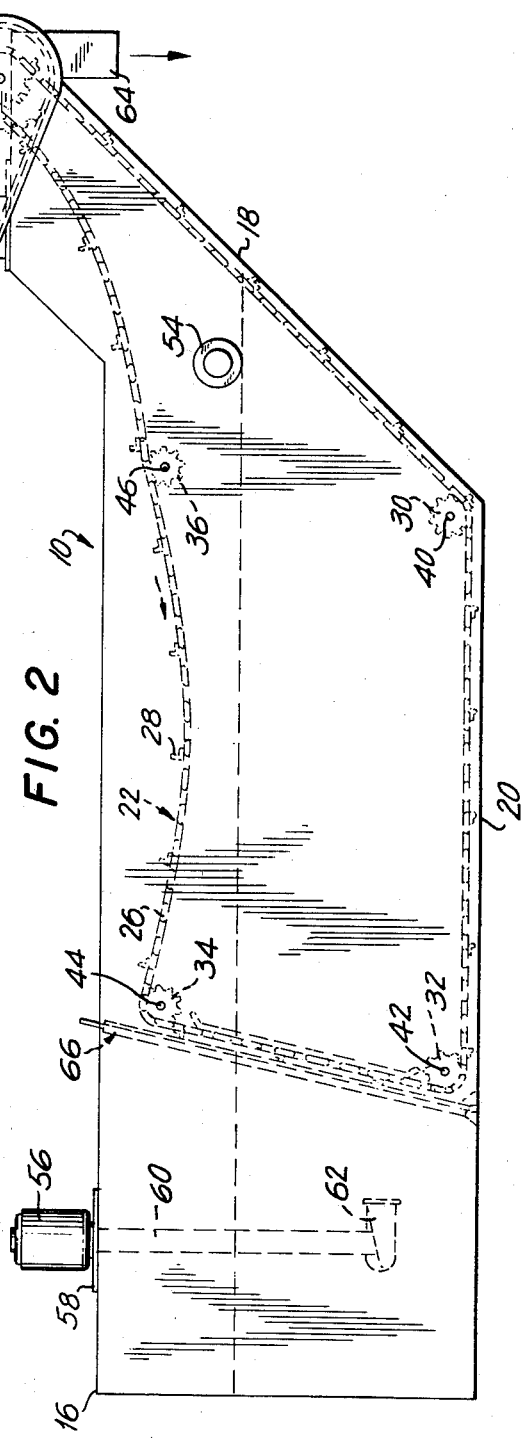
FIG. 1
FIG. 2

SLUDGE TANK WITH SELF-CLEANING SCREEN AND SCREEN FOR USE THEREIN

This is a division, of application Ser. No. 72,746, filed Sept. 16, 1970 now U.S. Pat. No. 3,675,778.

This invention relates generally to conveyorized sludge tanks of the type in which relatively coarse objects are separated by sedimentation from a liquid medium in which they are suspended and then removed from the tank by the flights of a moving conveyor positioned partially within the tank. More particularly, the invention relates to a novel filter member adapted to be used in conjunction with such a sludge tank to promote clarification of the liquid medium and to a novel arrangement of the filter member within the tank. The apparatus of the present invention is particularly well adapted to be used in conjunction with a sludge tank employed for removing chips of metal from a metal working coolant of the type used in various machining operations, and will be illustratively described in connection with such an application. However, as the description proceeds it will become apparent that the present invention is also useful in clarifying other kinds of liquid media having other kinds of coarse particles or objects suspended therein.

Conveyorized sludge tanks have been commonly used for removal of metal cuttings and other foreign materials from machine tool cutting fluids. Such sludge tanks are primarily settling tanks wherein the suspended matter accumulates at the bottom of a tank having a sloping end wall. The transverse vanes or flights of an endless conveyor move the settled solids along the bottom of the tank toward the sloping end wall, up the sloping end wall and out of the tank to a suitable point of disposal. It has been found in the operation of such tanks that when the flow of "dirty" coolant to the sludge tank and removal of clarified coolant from the tank is maintained at a practical level, a certain amount of solid material remains suspended in the clarified coolant leaving the tank and that this suspended matter tends to clog the pump or pumps used to recirculate the coolant to the machining operation.

In an effort to solve this problem, screens have been used at or near the clarified coolant outlet from the tank. However, such screens tend to become clogged with solid materials in a relatively short period of time and require frequent removal for cleaning.

It is accordingly an object of the present invention to provide an improved filter member or screen adapted to be used in a conveyorized sludge tank to improve the clarification of the liquid component of a suspension being processed therein. It is another object of the invention to provide in such a conveyorized sludge tank a filter member so constructed and arranged in respect to the conveyor flights that the filtering surface of the filter member is continuously wiped or scraped by the flights of the conveyor to remove accumulated material therefrom. It is a further object of the invention to provide an arrangement of a filter member in a conveyorized sludge tank that reduces the tendency of the filter to become clogged. It is still another object of the invention to provide such an arrangement wherein wear of the filtering surface and cooperating conveyor flights is minimized and equalized. It is still another object of the invention to provide such as arrangement wherein the filter member may be readily removed for cleaning.

Other objects of the invention will be in part obvious and in part pointed out hereafter.

The many objects and advantages of the present invention may be best understood and appreciated by reference to the accompanying drawings which illustrate apparatus incorporating a preferred embodiment of the invention and wherein:

FIG. 1 is a top plan view of a sludge tank showing an endless conveyor and cooperating filter member therein;

FIG. 2 is a side view of the sludge tank further showing the relation between the conveyor and filter member;

Figure 3:
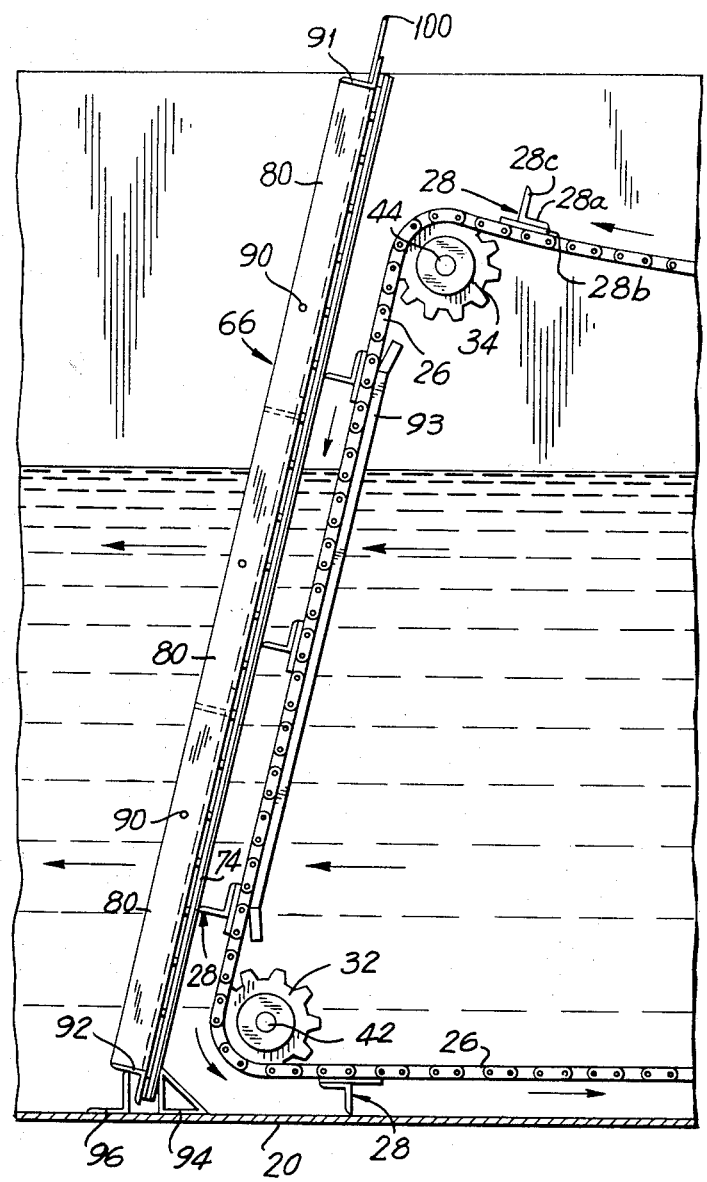
FIG. 3 is an enlarged vertical section taken on the line 3—3 of FIG. 1 and particularly showing the mounting of the filter element.

Referring to the drawings and more particularly to FIGS. 1 and 2, the numeral 10 generally designates a sludge tank having side walls 12 and 14, vertical end wall 16, sloping end wall 18 and bottom 20. Mounted within the sludge tank 10 there is an endless conveyor generally designated 22 comprising a pair of chain belts 24 and 26 located near the side walls of the tank and having secured thereto a series of transverse flights or scraper members 28. As best shown in FIG. 3 and referring particularly to the upper portion of FIG. 3, each of the flights 28 comprises an angle iron, the flange 28a of which is secured to a transverse strip 28b which is in turn secured to the chain belts 24 and 26, and the other flange 28c of which extends perpendicularly outward from the chain belts to provide the desired wiping or scraping action.

Reverting to FIGS. 1 and 2, the chain belt 26 is supported on a series of sprockets 30, 32, 34, 36 and 38 secured to transverse shafts 40, 42, 44, 46 and 48, respectively, mounted for rotation in the side walls 12 and 14 of the sludge tank. Chain belt 24 is mounted on similar sprockets secured to the shafts 40 to 48 near the side wall 12 of the sludge tank. The conveyor is driven counter-clockwise as shown in FIG. 2 through shaft 48 by a motor 50 through a reduction train 52.

The suspension to be clarified is supplied to the sludge tank 10 through an inlet connection 54 in the side wall 14 of the tank near the sloping end 18 thereof. Clarified liquid is removed from the tank near the end wall 16 by a pump 56 mounted on a platform 58 attached to the top of the side walls 12 and 14. Extending downwardly from the pump 56 there is a suction pipe 60 having a suction inlet 62 at its lower end.

Within the sludge tank 10 most of the solids contained in the suspension charged to the sludge tank settle to the bottom of the tank. As the conveyor 22 is driven by motor 50, flights 28 of the bottom course of the conveyor, which are located close to the bottom of tank 20, move the material that has settled to the bottom of the tank to the right as shown in FIG. 2 and thence upwardly along the sloping wall 18 to a chute and thence to a suitable point of disposal.

As has been pointed out above, a certain proportion of the suspended solids do not settle to the bottom of the tank during the time that the suspension is in the tank and in prior sludge tanks this unsettled material has tended to accumulate in the suction of the clarified liquid pump 56 thus clogging the suction of the pump. In accordance with the present invention, a screen 66 having a novel construction and arrangement is interposed between the section of the sludge tank containing the conveyor 22 and the suction of pump 56.

Figure 5:
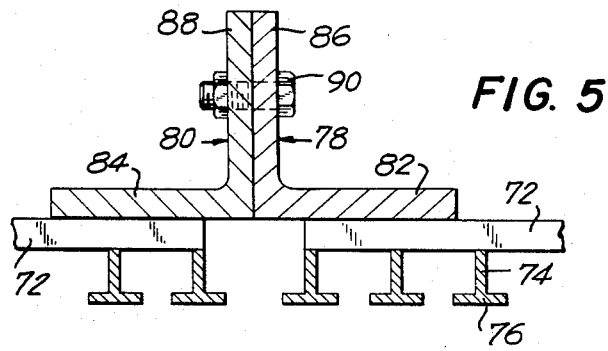
FIG. 5 is a detail section taken on the line 5—5 of FIG. 4 showing the manner in which the sections of the filter member are connected.
Figure 4:
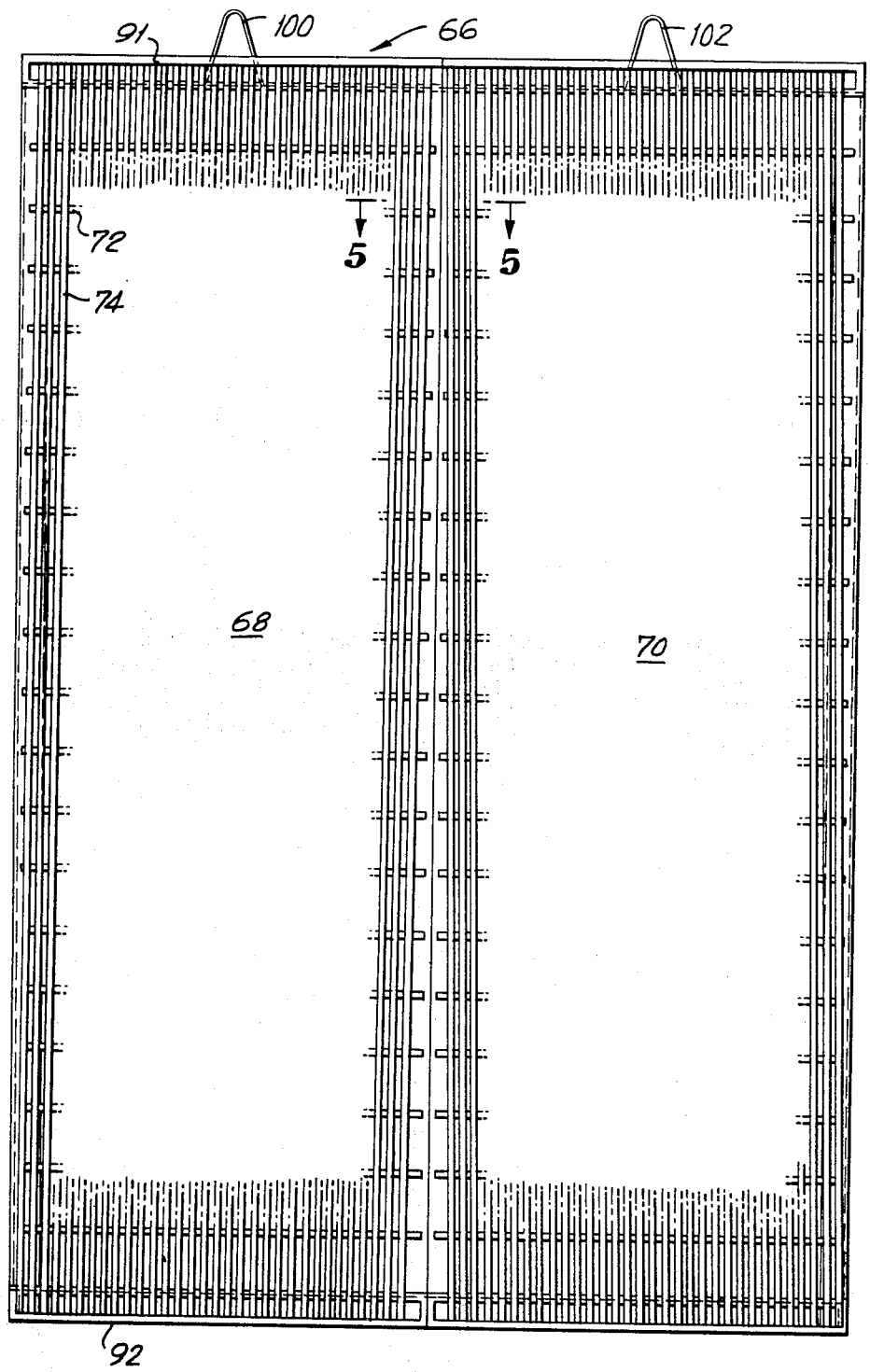
FIG. 4 is a front view of the filter member showing the herringbone arrangement of the filter strips thereof.

The construction of the screen is best shown in FIGS. 3, 4 and 5 of the drawings. Referring particularly to FIG. 4, the screen there shown comprises two sections 68 and 70. Each section of the screen is essentially a grid comprising the horizontal bars 72 having spaced vertical filtering strips 74 secured thereto. As shown in FIG. 5, the filtering strips 74 are T-bars with the cross members 76 of the T-bars forming the filtering surface of the screen. The distances between the filtering strips 74 may be varied depending upon the nature and size of the chips or other objects to be filtered.

Also as shown in FIG. 5, the sections 68 and 70 of the screen are interconnected by means of angle irons 78 and 80. The flange 82 of angle iron 78 is secured to the cross bars 72 of the screen section 70, and the flange 84 of angle iron 80 is secured to the cross bars 72 of section 68. The flanges 86 and 88 of angle irons 78 and 80 are bolted together by the bolts 90 to connect the screen's sections 68 and 70 to each other. As indicated in FIG. 3, three pairs of angle irons are used along the length of the screen and at the top and bottom of the screen transverse angle irons 91 and 92 are secured to the topmost and bottommost crossbars 72 to provide additional structural strength. As shown in FIGS. 3 and 4, screen 66 is provided at its top with the handles 100 and 102 to facilitate its removal from the tank for cleaning.

Referring particularly to FIG. 4, it will be noted that the lower ends of filtering strips 74 of section 68 of screen 66 are positioned slightly to the left of the tops of said strips so that the filtering strips form a small angle with respect to the longitudinal axis of the screen. This lateral displacement of the filtering strips is preferably made approximately equal to the distance between the centers of adjacent strips. In a similar manner the lower ends of filtering strips 74 of screen section 70 are laterally positioned slightly to the right of the tops of said strips. Thus the filtering strips 74 of the two screen sections 68 and 70 form a herringbone pattern. As explained more fully below, this angular arrangement of the filtering strips serves to minimize and equalize wear on the flights 28 of conveyor 22.

The mounting of the screen within the sludge tank and its cooperative relation with conveyor 22 are best shown in FIG. 3 of the drawings. Referring to FIG. 3, the sprockets 32 are positioned somewhat nearer the end wall 16 of the sludge tank than the sprockets 34 to cause the portion of the conveyor between these sprockets to move along an approximately vertical but slightly tilted path, hereafter referred to for convenience as the vertical course of the conveyor. To ensure that the conveyor will follow a linear path during its vertical course a guide member 93, secured to the side walls of the tank, is located inside the conveyor and adjacent thereto in such manner that the conveyor belt chains 24 and 26 slide thereover. To provide a mounting for the screen, there are secured to the bottom 20 of tank 10 a triangular abutment 94 and spaced angle iron abutment 96. The bottom of the screen and more particularly one flange of the angle iron 92 and the lower ends of the filtering members 74 extend into the space between abutments 94 and 96 in such manner that the bottom of screen 66 is removably and pivotally supported near the bottom of tank 20, but is not connected thereto. As shown in FIG. 3, the screen is arranged at such an angle that it leans against the flights 28 of the conveyor 22 and is substantially parallel with the vertical course of the conveyor. The angle that the screen forms with the vertical will vary with such factors as conveyor speed, size and type of chips being filtered and the type and capacity of the clarified liquid pump. Usually this angle will be in the range 5° to 30° for good performance.

As the flights 28 of conveyor 22 move downwardly in contact with the filter members 74 of the screen, they remove any accumulated solids on the filtering surface of the screen and deposit them on the bottom of the tank, whence they are scraped along the bottom of the tank as described above. Since the screen 66 merely rests against the conveyor flights and is pivotable at its lower end, it is free to move away from the conveyor flights in the event that any objects are caught between the filtering members 74 of the screen and the conveyor flights and are difficult to dislodge.

As has been pointed out above, the filtering members 74 of the screen sections 68 and 70 are arranged at a small angle with respect to long dimensions of the sections. If the filtering members were precisely parallel to the longitudinal axis of the screen sections, they would tend to wear grooves in the portions of the conveyor flights that wipe the filtering surface of the screen. By positioning the filtering strips at an angle, wear on the conveyor flights is equalized. Moreover, if all of the filtering strips were displaced angularly in the same direction, movement of the conveyor flights along the filtering surface would develop a torque or other distorting force. By using the herringbone pattern described above, these forces are balanced and a more stable operation is achieved.

From the foregoing description it should be apparent that the present invention provides a filter element and arrangement thereof in a sludge tank capable of achieving the objects set forth at the beginning of the present specification. By arranging the screen parallel to the tilted vertical course of the conveyor, continuous wiping and cleaning of the filtering surface of the screen is achieved. Since the screen leans against the conveyor flights and is held thereagainst by the force of gravity, and since it is pivotally mounted at the bottom, it can readily move away from the conveyor if a large object is caught in the space between the filtering strips, thereby avoiding damage to the filtering surface. Since the screen rests freely on spaced abutments at the bottom of the tank, it can be readily removed for cleaning.

It is of course to be understood that the foregoing description is intended to be illustrative only and that numerous changes can be made in the specific embodiment disclosed and described without departing from the spirit of the invention as defined in the appended claims.

I claim:

1. Filtering apparatus comprising a tank having a first compartment adapted to contain a liquid suspension from which suspended matter is to be removed, a second compartment adapted to contain clarified liquid and a filter member between said two compartments, means for supplying suspensions to be clarified to said first compartment, means for removing clarified liquid from said second compartment, movable filter cleaning means having a series of filter-engaging members in said first compartment and means for driving said filter cleaning means to cause said filter-engaging members to continuously wipe the filtering surface of said filter member, said filter member being mounted on the bottom of said tank for swinging motion toward or away from said filter cleaning means and being normally positioned to lean against the filter-engaging members of said filter cleaning means.

2. Apparatus according to claim 1 wherein the filter member leans against the filter engaging members at an angle of 5° to 30° from the vertical.

3. Apparatus for removing relatively coarse objects from a liquid in which they are suspended comprising a sludge tank having a first compartment with an outwardly sloping end wall, adapted to contain a suspension from which suspended objects are to be removed, a second compartment adapted to contain clarified liquid and a filter member between said two compartments, means for supplying suspension to be clarified to said first compartment, means for removing filtrate from said second compartment, an endless conveyor having spaced transverse flights and positioned partially within said first compartment, said conveyor having a first course adjacent to a filtering surface of said filter member, a second course adjacent to the bottom of said first compartment and a third course adjacent to said sloping end wall, means for driving said conveyor to cause the flights thereof to wipe the adjacent surface of said filter member then, move along the bottom of said tank and then move along said sloping end wall to remove from said first compartment objects separated from said suspension, said filter member being mounted on the bottom of said tank for swinging motion toward and away from said conveyor and being normally positioned to lean against the flights of said first course of said conveyor whereby objects accumulating on the filtering surface of said filter member are continuously removed therefrom by said conveyor flights.

4. Apparatus according to claim 3 wherein said filter member rests on the bottom of said filter tank without being connected thereto.

5. Apparatus according to claim 3 wherein said filter member and adjacent course of said conveyor are arranged at an angle 5° to 30° from the vertical.

6. Apparatus according to claim 3 wherein the filtering surface of said filter member comprises a series of approximately vertically arranged strips closely spaced to prevent said objects from passing therethrough and wherein the strips forming said filtering surface are arranged at a small angle with respect to the longitudinal dimension of the screen to equalize wear of the flights of said conveyor.

7. Apparatus according to claim 6 and wherein the small angle is of a magnitude such that the bottoms of said filtering strips are laterally displaced in respect to the tops of said filtering strips by an amount substantially equal to the distance between the centers of adjacent filtering strips.

8. Apparatus according to claim 7 wherein said screen is formed of two or more sections and the strips of adjacent sections are arranged at diverging angles whereby they form a herringbone pattern.

* * * * *